(12) United States Patent
Zhang et al.

(10) Patent No.: US 6,866,794 B1
(45) Date of Patent: Mar. 15, 2005

(54) STRONTIUM PEROXIDE CATALYZED OXYGEN GENERATING COMPOSITIONS

(75) Inventors: Yunchang Zhang, Overland Park, KS (US); James C. Cannon, Overland Park, KS (US)

(73) Assignee: BE Intellectual Property Inc., Wellington, FL (US)

( * ) Notice: Subject to any disclaimer, the term of this patent is extended or adjusted under 35 U.S.C. 154(b) by 164 days.

(21) Appl. No.: 09/716,846

(22) Filed: Nov. 15, 2000

(51) Int. Cl.⁷ ............................................. C09K 3/00
(52) U.S. Cl. .................. 252/186.24; 252/186.21; 252/186.43; 252/187.31
(58) Field of Search .................. 252/186.24, 186.21, 252/186.43, 187.31

(56) References Cited

U.S. PATENT DOCUMENTS

| | | | |
|---|---|---|---|
| 2,469,414 A | | 5/1949 | Schechter |
| 3,207,695 A | | 9/1965 | Gustafson |
| 3,293,187 A | | 12/1966 | Markowitz |
| 3,702,305 A | | 11/1972 | Thompson |
| 3,736,104 A | | 5/1973 | Churchill |
| 3,914,315 A | | 10/1975 | Miyake |
| 5,279,761 A | * | 1/1994 | Zhang et al. .......... 252/187.31 |
| 5,298,187 A | * | 3/1994 | Zhang et al. ............ 252/187.1 |
| 5,783,105 A | * | 7/1998 | Zhang et al. ............ 252/187.1 |

FOREIGN PATENT DOCUMENTS

| | | |
|---|---|---|
| CN | 1035248 A | 9/1989 |
| WO | WO 93 17961 A | 9/1993 |
| WO | WO 97 43210 A | 11/1997 |

OTHER PUBLICATIONS

Database Compendex 'On Line' Engineering Information, Inc. New York, NY, US XP–002195058 Jul. 2000.
International Search Report dated Apr. 17, 2002.

* cited by examiner

Primary Examiner—Cephia D. Toomer
(74) Attorney, Agent, or Firm—Fulwider Patton Lee & Utecht, LLP

(57) ABSTRACT

The oxygen generating compositions are formed from a metal powder as a fuel, strontium peroxide as a chlorine suppressant, a catalyst, a reaction rate modifier, and an oxygen source selected from the group consisting of alkali metal chlorates, alkali metal perchlorates, and mixtures thereof. The oxygen generating compositions can optionally also further comprise a transition metal oxide catalyst, and can optionally further include a binder as a pressing aid for forming an oxygen generating oxygen generating block or core. The oxygen generating compositions can be formed from zero to about 15% by weight of metal powder as a fuel, about 0.1%–20% by weight strontium peroxide, from zero to about 15% by weight of a transition metal oxide catalyst, from zero to about 5% of an optional binder, and the remainder of an oxygen source selected from the group consisting of alkali metal chlorates, alkali metal perchlorates, and mixtures thereof.

10 Claims, 1 Drawing Sheet

STRONTIUM PEROXIDE CATALYZED OXYGEN GENERATING COMPOSITIONS

BACKGROUND OF THE INVENTION

1. Field of the Invention

The present invention is broadly concerned with improved chemical oxygen generating compositions, and more particularly is concerned with improved chemical oxygen generating compositions containing strontium peroxide as a chlorine suppressant, reaction rate modifier, catalyst and a secondary oxygen source. Although the application of the oxygen generating compositions in this invention can be used as an emergency source of breathable oxygen, such as in passenger aircraft, the application of the oxygen generating compositions of the invention is not limited to aviation. The formulation can also have other applications such as in submarines, diving and mountain climbing, where it is useful to furnish a convenient reliable supply of oxygen gas of breathable quality.

2. Description of Related Art

Chemical oxygen generating compositions based upon the decomposition of alkali metal chlorates and perchlorates have long been used as an emergency oxygen source, such as in passenger airplanes. A typical chemical oxygen generator for aviation contains a chemical oxygen generating core. The chemical core typically has several layers of chemical mixtures with different compositions and thus different reaction rates. Multiple layers are used in the core instead of a single composition to match the oxygen requirements determined by the descend profile of an airplane following a loss of cabin pressure. The chemical oxygen generating core typically has a cylindrical shape with a taper, with a recess at one end to hold an ignition pellet. The ignition pellet is typically ignited by a primer. The heat from the ignition pellet then initiates the decomposition of the chlorates and/or perchlorates in the body of the chemical oxygen generating core and starts oxygen generation. The chemical ingredients for each layer of the chemical core are mixed together and a small amount of water is added to the mix to facilitate the mixing. The wet mixes are then poured into a mold in order and pressed into the chemical oxygen generating cores. The water in the mixes serves as a binder and a lubricant to facilitate mixing and pressing. Without water as a lubricant it would be extremely difficult to press the dry chemical powders into chemical cores with desired shape and density. The water in the chemical cores is then removed through drying in an oven.

Such chemical oxygen generating compositions typically contain one or more of sodium chlorate, lithium perchlorate and potassium perchlorate as an oxygen source. The chlorate and perchlorates decompose to produce oxygen gas once the reaction is initiated. A catalyst is typically used to facilitate the decomposition and a metal powder is used as a fuel to supply some extra heat to sustain the decomposition reaction. During the decomposition of sodium chlorate, lithium perchlorate, and potassium perchlorate, a small amount of chlorine gas is formed through side reactions. Chlorine gas is toxic and needs to be removed, usually with a filter installed inside of the chemical oxygen generator. Since big and heavy filters are undesirable for aviation applications, an alkaline compound is typically mixed in the oxygen generating compositions to suppress the chlorine formation and to scrap it if formed.

A chemical oxygen generator for an airplane is commonly preprogrammed according to the descend profile of the airplane and must meet the minimum oxygen flow requirement at all times during a descent. The oxygen generation rate can be erratic and uneven. In order for the trough of the oxygen flow rate to still be above the minimum flow rate requirement, extra chemicals need to be used. This increases the weight and is undesirable. A reaction rate modifier needs to be used to have a relatively smooth oxygen flow rate from the oxygen generator. It is preferable if one chemical can serve as both the chlorine suppressant and reaction rate modifier. $BaO_2$, $Li_2O_2$, $Na_2O_2$ and $Na_2O$, $Ca(OH)_2$, and $MgO$ have been used in chemical oxygen generating cores as chlorine suppressants and reaction rate modifiers. However, there are problems associated with the use of these alkaline chemicals.

Barium peroxide is considered toxic by government agencies around the world. Disposal of expended oxygen generators and scraps containing barium peroxide is difficult and expensive. Many customers prefer to use oxygen generators that do not contain barium compounds.

Sodium oxide and peroxide are air sensitive. They react with moisture and $CO_2$ in the air. Therefore, moisture and $CO_2$ need to be avoided during the manufacturing of the chemical cores containing sodium oxide and peroxide. In the absence of water as a binder and lubricant, it is very difficult to press the dry chemical powder mixture to desired shape and density, and the process is much more difficult and expensive. In addition, sodium oxide and peroxide are very caustic and corrosive. They react with water to form sodium hydroxide, which is also caustic and corrosive, and releases a large amount of heat.

Lithium peroxide is also unstable and it reacts with water to form, lithium hydroxide, particularly at elevated temperatures. Lithium peroxide is a very strong inhibitor for the decomposition of sodium chlorate, potassium perchlorate and lithium perchlorate. Only a small amount, such as a fraction of one percent, of lithium peroxide can be used in the chemical oxygen generating compositions. It takes a prolonged mixing to distribute such a small amount of lithium peroxide uniformly in the chemical oxygen generating compositions. Lithium peroxide is also relatively expensive, and a reliable supplier that supplies large quantity of lithium peroxide does not exist in the US.

Calcium hydroxide is better than the alkaline oxide and peroxides described above but it also has some undesirable properties. Calcium hydroxide suppresses the side reaction for chlorine formation and it can modify the oxygen generating reaction to have a smooth oxygen generation rate. But it has minimal catalytic activity and an additional catalyst has to be used with it. Since it is a very strong inhibitor for the decomposition of the chlorate and perchlorates, only a small amount such as a fraction of one percent can be used. It takes a prolonged mixing to distribute such a small amount in the compositions. It decomposes at around 580° C. to calcium oxide and water. The water can increase the moisture level in the oxygen produced by the oxygen generators. It is necessary to use a prolonged drying for the chemical cores so that the moisture level in the oxygen does not exceed the maximum level allowed by some applications.

Magnesium oxide and hydroxide have also been used as chlorine suppressants and reaction rate modifiers. However, their inhibiting ability is not high enough and their alkalinity is not high enough, and a relatively high percentage of loading has to be used. Since magnesium oxide and hydroxide are light and fluffy, it is difficult to achieve high density for the chemical oxygen generating cores if a high loading of these two compounds are used. For aviation applications, the volume of a product is also critical. One needs to save as much space as possible for the payloads. In addition, magnesium oxide and hydroxide do not produce oxygen, and a high loading would reduce the oxygen yield, which is undesirable. Magnesium hydroxide decomposes at 350° C. to magnesium oxide and water, which can increase moisture level in the oxygen, and this can be a problem for some applications.

Because of the problems associated with the chemical oxygen generating compositions given in the prior art it is necessary to have improved chemical oxygen generating compositions that are environmentally friendly, inexpensive, stable in the presence of water, easy to be manufactured, and have high oxygen yield. These compositions can be mixed and pressed with water as a mixing and pressing aid. The chemical oxygen cores made from these compositions have smooth oxygen generation rates and produce reduced levels of chlorine in the oxygen generated.

It is thus desirable to provide an improved oxygen generating formulation containing an additive that works as a chlorine suppressant, catalyst, reaction rate modifier and an additional oxygen source, for generating a smooth flow of oxygen with low levels of chlorine contamination and low toxicity, and which is easier and less expensive to manufacture. Chemical oxygen generating compositions that use strontium peroxide as a chlorine suppressant, reaction rate modifier, catalyst and secondary oxygen source in the present invention meet these needs.

SUMMARY OF THE INVENTION

Briefly, and in general terms, the present invention provides for improved chemical oxygen generation compositions containing strontium peroxide ($SrO_2$), as a chlorine suppressant, catalyst, reaction modifier and a secondary oxygen source. Using strontium peroxide instead of other additives makes the chemical oxygen generating compositions produce a greater uniformity of performance and a smoother and more uniform rate of oxygen generation, and are easier to mix. The chemical oxygen generating cores made from these compositions are easier to manufacture, chemically stable and environmentally friendly and generate oxygen at even and smooth rates and the oxygen has reduced level of chlorine gas contamination.

The invention accordingly provides for an oxygen generating composition for producing a breathable oxygen gas upon ignition of the composition, comprising an oxygen source selected from the group consisting of alkali metal chlorates, alkali metal perchlorates and mixtures thereof. The oxygen generating composition contains strontium peroxide as a chlorine suppressant, reaction rate modifier, catalyst and a secondary oxygen source, and a metal powder fuel to provide the extra heat needed for the decomposition of the oxygen sources. The oxygen generating composition may optionally also contain a transition metal oxide such as cobalt oxide as a catalyst and can optionally include a press aid such as a glass powder.

In one preferred embodiment, the chemical oxygen generating composition can comprise an oxygen generating composition for producing a breathable oxygen gas upon ignition of the chemical core made of the composition, comprising from zero to about 15% by weight of a metal powder as a fuel, about 0.1%–20% by weight strontium peroxide as a chlorine suppressant, a catalyst, a reaction rate modifier, and a secondary oxygen source, from zero to about 15% by weight of a transition metal oxide catalyst, from zero to about 5% by weight of an optional binder, and the remainder of an oxygen source selected from the group consisting of alkali metal chlorates, alkali metal perchlorates, and mixtures thereof. In a currently preferred embodiment, the metal powder is tin powder, iron powder, or a combination thereof, although the metal powder can also be selected from titanium, copper, aluminum, and magnesium. In a presently preferred aspect, the metal powder comprises approximately 0–12% by weight of the composition. In another presently preferred aspect, the strontium peroxide comprises approximately 0.5–6% of the composition.

In another presently preferred aspect, the composition can optionally comprise 0.1 to 10% of a transition metal oxide catalyst. In a preferred embodiment, the transition metal oxide catalyst can be selected from cobalt oxide, copper oxide, nickel oxide, iron oxide, manganese oxide, or mixtures thereof, and in a presently preferred aspect, the transition metal oxide catalyst is selected from cobalt oxide, nickel oxide and copper oxide, and mixtures thereof. The oxygen source is preferably selected from sodium chlorate, potassium perchlorate, lithium perchlorate, and mixtures thereof. In a currently preferred embodiment, the optional binder is an inorganic binder selected from the group consisting of glass powder, glass fiber, ceramic fiber, steel wool, bentonite, kaolinite and mixtures thereof.

Strontium peroxide provides all the benefits without the problems associated with the use of sodium oxide and peroxide, barium peroxide, lithium peroxide, calcium hydroxide and magnesium oxide and hydroxide. Strontium peroxide is more alkaline than magnesium oxide and calcium hydroxide and thus is more effective as a chlorine suppressant. It is not as caustic as sodium oxide and peroxide. Strontium peroxide is not considered toxic and thus is more environmentally friendly. It is stable enough so that water can be added to the compositions containing strontium peroxide, to facilitate the mixing and pressing.

Strontium peroxide by itself is a moderately active catalyst for the decomposition of sodium chlorate, lithium perchlorate and potassium perchlorate. It can be used in the bottom layers of the chemical cores without the need of another active transition metal oxide catalyst. In the top layers of the chemical core where a high oxygen generation rate is required, strontium peroxide can be used together with an active transition metal oxide catalyst, such as cobalt oxide, as a chlorine suppressant and a reaction rate modifier, so that the oxygen generation rate from these top layers is smooth, and the oxygen from these layers has a substantially lower chlorine level.

Strontium peroxide is a moderately active catalyst for the decomposition of the chlorate and perchlorates by itself and is a moderately active inhibitor for the decomposition when used with active transition metal oxide catalyst such as cobalt oxide. Therefore, several percent of strontium peroxide can be used in the compositions. It is much easier to distribute several percent of strontium peroxide than to distribute a fraction of a percent of the other alkaline compounds in the chlorate and perchlorates.

In the bottom layers of a chemical core, where the oxygen generation rate does not need to be high, strontium peroxide alone can be used as a catalyst without the need to use a transition metal catalyst such as cobalt oxide. In absence of the black cobalt oxide, the bottom layers can be white or light colored and can be visually different from the color of the top layers where black cobalt oxide is used. This can help avoid the possibility that the bottom layers are mixed up with the top layers.

Strontium peroxide decomposes at 410° C. to strontium oxide and oxygen and thus can be used as a secondary oxygen source. This would increase the overall oxygen yield of the chemical cores with other things being equal. Therefore, chemical oxygen generating compositions with strontium peroxide as a chlorine suppressant, catalyst, reaction rate modifier, a secondary oxygen source is superior to chemical oxygen generating compositions using other chlorine suppressants, and reaction rate modifiers.

These and other aspects and advantages of the invention will become apparent from the following detailed description, and the accompanying drawing, which illustrates by way of example the features of the invention.

BRIEF DESCRIPTION OF THE DRAWINGS

The FIGURE is a cross sectional view of an oxygen generating block formed from the oxygen generating composition according to the principles of the invention.

DETAILED DESCRIPTION OF THE PREFERRED EMBODIMENTS

Figure 1:
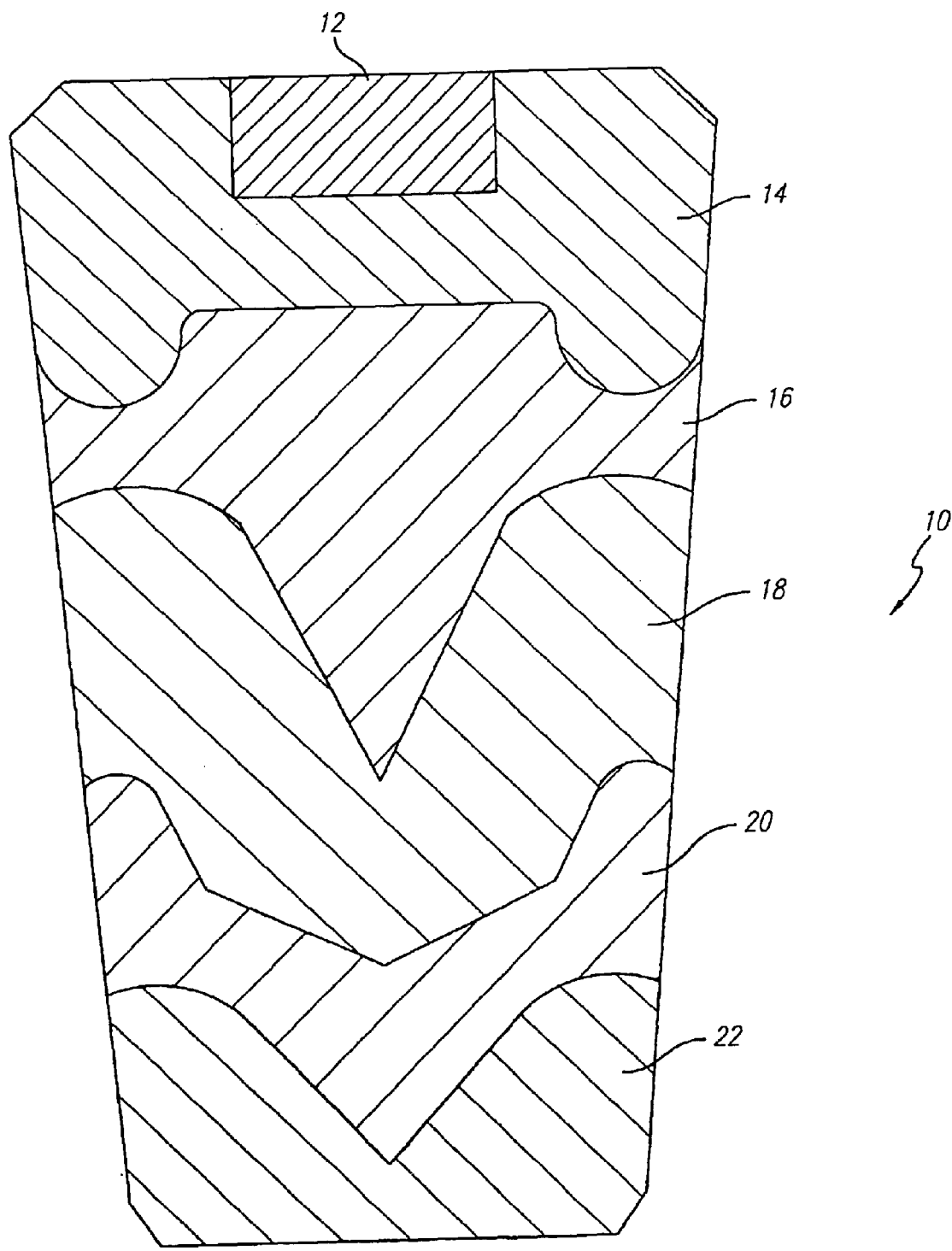

Flow of oxygen from an activated chemical oxygen generator can often be uneven and erratic if an active catalyst is used without the use of a reaction rate modifier. Together with the generation of oxygen, a small amount of chlorine gas is also produced through side reactions. The formation of chlorine needs to be eliminated or reduced since it is toxic. Alkaline compounds such as sodium oxide and peroxide, barium peroxide, lithium peroxide, magnesium oxide and hydroxide, and calcium hydroxide have been used to suppress chlorine formation. There are problems associated with the use of these alkaline compounds in the chemical oxygen generating cores as discussed above. This invention provides chemical oxygen generating compositions that use strontium peroxide, instead of the alkaline compounds described above, as a chlorine suppressant and reaction rate modifier. Strontium peroxide by itself is also a moderately active catalyst for the decomposition of alkali metal chlorates and perchlorates in the chemical cores. During the operation of a chemical oxygen generator, strontium peroxide decomposes to strontium oxide and gives off oxygen, and thus is a secondary oxygen source. Therefore, strontium peroxide as an additive is superior to sodium oxide and peroxide, barium peroxide, lithium peroxide, magnesium oxide and hydroxide and calcium hydroxide for chemical oxygen generating compositions.

The invention is accordingly embodied in an oxygen generating composition for producing a breathable oxygen gas upon activation of a chemical oxygen generator containing a chemical core made of the chemical composition comprising an oxygen source selected from the group of alkali metal chlorates, alkali metal perchlorates, and mixtures thereof, a metal powder fuel, and strontium peroxide as a chlorine suppressant, catalyst reaction rate modifier and a secondary oxygen source. The chemical oxygen generating composition can optionally also comprise a transition metal oxide catalyst and can further include a binder as a press aid. The chemical core generally has more than one layer, and each layer has a different composition. The chemicals for each layer are mixed separately, and a small amount of water is used to wet the chemicals to facilitate the mixing. The several chemical ingredients the composition have different particle sizes and different densities. Without water ingredients tend to segregate from each other. When water is added to the mixture, however, the minor ingredients will stick to the chlorate and perchlorate particles and do not segregate.

In presently preferred embodiment, the oxygen generating composition of the invention generally comprises about 0.5–15% by weight of a metal powder as a fuel to supply the extra heat to sustain the decomposition of the oxygen source. The presently preferred fuel includes tin powder and iron powder, or a combination of the two powders. Other powders such as titanium and copper can also be used as fuels, as long as they have high purity and a small particle size. Aluminum and magnesium can also be used because they are substantially free of carbon and are energetic, and other similar metal powders or other types of fuels may also be suitable as a fuel to supply the extra heat to sustain the composition of the oxygen source.

The oxygen generating composition may optionally contain up to about 15% of a transition metal oxide catalyst, and in a presently preferred embodiment, the oxygen generating composition comprises from zero to about 12% by weight of a transition metal oxide catalyst. The transition metal oxide catalyst can, for example, be selected from the group consisting of cobalt oxide, nickel oxide, copper oxide, and mixtures thereof. Since these metal oxide catalysts are so active that the decomposition of the alkali metal chlorate and perchlorate oxygen source can occur in the solid phase. Decomposition in the solid phase may result in erratic or uneven oxygen flow rate and thus is not preferred. Therefore, it is beneficial to use a reaction rate modifier to reduce the catalytic activity of the catalysts slightly so that the decomposition of the oxygen source occurs in a viscous partially molten phase. This permits smooth release of the oxygen gas generated through the decomposition of the alkali metal chlorates or perchlorates.

We have found that strontium peroxide is useful not only as a chlorine suppressant but also as a catalyst for the decomposition of sodium chlorate, potassium perchlorate, and lithium perchlorate. When used together with transition metal oxide catalysts such as cobalt oxide, strontium peroxide serves as a reaction rate modifier that slows down the reaction and makes the reaction proceed in a controlled and organized way. In addition, $SrO_2$ by itself is also an oxygen source. When heated, it decomposes to strontium oxide and releases oxygen gas. Neither strontium peroxide nor strontium oxide is toxic and they are not caustic. Therefore, the disposal cost of the scraps and expended chemical cores is much lower.

Strontium peroxide is able to provide all the benefits without the problems associated with the use of sodium oxide and peroxide, barium peroxide, lithium peroxide, calcium hydroxide, as well as magnesium oxide and hydroxide in chemical oxygen generating compositions. Strontium peroxide catalyzes the decomposition of alkali metal chlorates and perchlorates, suppresses the formation of chlorine gas, and decomposes at about 410° C. to produce oxygen. Strontium peroxide is also advantageous as a component of chemical oxygen generating compositions because it is stable in air and is relatively inexpensive. Therefore, strontium peroxide is an ideal additive for chemical oxygen generating formulations.

The use of strontium peroxide as a chlorine suppressant and at the same time as a catalyst, reaction rate modifier and an additional oxygen source is considered to be critical to invention. Strontium peroxide in powder form as supplied by Barium & Chemicals Inc. and by Hummel Croton, Inc. is suitable. The strontium peroxides meets MIL-S-612B standards and contains about 92% strontium peroxide, 4–6% strontium carbonate, and 2–4% strontium hydroxide. Strontium peroxide from other sources should also be suitable as long as it has a small particle size and a high content of strontium peroxide.

The loading of strontium peroxide in the chemical oxygen generating composition can be in the range of from about 0.1 to about 20% by weight. In a presently preferred embodiment, strontium peroxide comprises approximately 1–12% by weight of the composition. In another presently preferred embodiment strontium peroxide comprises approximately 1–6% of the composition. Strontium peroxide is a moderately active catalyst for the decomposition of alkali metal chlorates and perchlorates, and it is active enough to be used in the bottom layers of the chemical cores without the need for an active transition metal oxide catalyst such as cobalt oxide. This makes the compositions for the bottom layers of the chemical cores simpler and easier to mix.

In the top layers of a chemical oxygen generating core, strontium peroxide can be used in combination with cobalt oxide so that the top layers can have a high and smooth oxygen flow rate. Strontium peroxide suppresses the catalytic activity of cobalt oxide slightly so that oxygen is generated in a controlled and even manner, and it suppresses the formation chlorine. In a presently preferred embodiment about 0.5 to 4% strontium peroxide can be used in the top layers with cobalt oxide.

The chemical oxygen generating compositions of the invention can also optionally further include up to about 5% of one or more binders as a pressing aid in formation of the chemical oxygen generating cores. In a presently preferred embodiment, the binder can be an inorganic binder such as glass powder, glass fiber, ceramic fiber, steel wool, bentonite, kaolinite, and mixtures thereof, for example, although other inorganic binders can also be suitable.

The remainder of the chemical oxygen generating composition preferably comprises a chemical oxygen source selected from the group consisting of alkali metal chlorates, alkali metal perchlorates, and mixtures thereof. The oxygen source is currently preferably selected from sodium chlorate, potassium perchlorate, lithium perchlorate, or mixtures of two or more of the chlorate and perchlorates, although other alkali metal chlorates and perchlorates may also be suitable. Sodium chlorate is presently preferred as the chemical oxygen source, due to its relatively low cost, and because it has a relatively high oxygen yield per unit weight compared to potassium chlorate and a reasonably low decomposition temperature compared to potassium chlorate and perchlorate and lithium perchlorate. Decomposition of sodium chlorate is exothermic once initiated, which permits a self-sustaining operation of a chemical oxygen generator containing a chemical core formed from the compositions of the invention.

In forming a chemical oxygen generating core, the minor constituents, including the strontium peroxide, the metal powder fuel, the optional transition metal oxide catalyst (if used) and the optional press aid material or binder (if used), are premixed. The premixed minor constituents are then mixed with the chemical oxygen source material. Approximately 1 to 5% water is used to wet down the mixture to facilitate the mixing. The metal powder strontium peroxide typically have higher density and smaller particle size than the alkali metal chlorates and perchlorates, and tends to segregate from the chlorates and perchlorates if no water is used. When water is used, the particles of the chlorates and/or perchlorates are wet, and the minor constituents particles can stick to them to prevent segregation. The chemical cores thus made are then dried in an oven at about 120° C. to remove the water added.

With reference to the figure, a typical chemical oxygen generating core 10 commonly is composed of several layers, with each layer having a different formulation. The multiple layers with different formulations are used to match the desired oxygen generation rate, based upon specified requirements of the application, since different applications may have different oxygen generation rate requirements. While the chemical oxygen generating core in the figure is illustrated as having five layers, depending on the application, any number of layers can be used to form a chemical oxygen generating core. The oxygen generating compositions of the invention can be used in one or more of the layers in the oxygen generating core. The various types of interface shapes between layers, as shown in the figure, are used to help control the transition of the reaction as it progresses from one layer to another. The interface shapes and relative sizes and reactivities of the layers can be modified, depending upon the oxygen generation requirements of the specified applications. Oxygen generating cores are typically formed in a cylindrical shape with a taper. At the top of the oxygen generating core there is a recess to hold an ignition pellet 12, which can be ignited by firing a percussion primer, for example. A typical ignition pellet can, for example, have a composition of about 25–35% iron by weight, 8 to 13% cobalt oxide by weight, 3 to 6% binder by weight, and the balance sodium chlorate. The heat from the ignition pellet then initiates the decomposition of the layers 14, 16, 18, 20 and 22 of the chemical oxygen generating core to release oxygen.

Strontium hydroxide has properties similar to those of strontium peroxide, as a chlorine suppressant, a catalyst, and as a reaction rate modifier in chemical oxygen generating compositions. Strontium hydroxide is a catalyst by itself for the decomposition of alkali metal chlorates and perchlorates, and it is an inhibitor when used together with a transition metal oxide catalyst. That is, it reduces the catalytic activity of the transition metal oxides. Strontium oxide can also be used with the understanding that it reacts with water and is converted to the hydroxide. Strontium hydroxide has a high tendency to form a hydrate. The hydrate releases water when heated. Therefore, strontium hydroxide and oxide can be used to replace strontium peroxide in the compositions in this invention, if a dry process is used.

The chemical oxygen generating compositions of the invention are further illustrated in the following examples, in which percentages are by weight.

EXAMPLE 1

1st layer: 15 grams. 11.0% tin powder, 9.0% $Co_3O_4$, 2.0% $SrO_2$, 4.0% glass powder and 74.0% $NaClO_3$.
2nd layer: 37 grams. 7.0% tin powder, 2.0% $SrO_2$, 1.0% glass powder, 2.0% $Co_3O_4$, and 88.0% $NaClO_3$.
3rd layer: 63 grams. 7.0% tin powder, 2.0% $SrO_2$, 1.3% $Co_3O_4$, 1.1% glass powder and 88.7% $NaClO_3$.
4th layer: 90 grams. 3.5% iron powder 3.0% $SrO_2$, 2.0% glass powder, 91.5% $NaClO_3$.
5th layer: 40 grams. 1.5% iron powder, 3.0% $SrO_2$, 2.0% glass powder and 93.5% $NaClO_3$.

The powders for each layer were premixed without sodium chlorate. The premixed powders were then mixed with sodium chlorate, and water was then added to the mixture, and the mixture was mixed further. Chemical oxygen generating cores were then formed by compaction of the damp mixtures in a mold. The oxygen generating cores were then dried at 120° C. to remove the water added.

A dried chemical oxygen generating core was loaded into a stainless steel housing and ignited using a primer and an ignition pellet. It operated for 18.2 minutes and generated 72 liters of oxygen at room temperature. The reaction was uniform and the oxygen generation rate is very smooth.

EXAMPLE 2

1st layer: 15 grams. 11.0% tin powder, 9.0% $Co_3O_4$, 2.0% $SrO_2$, 4.0% glass powder and 74.0% $NaClO_3$.
2nd layer: 37 grams. 7.0% tin powder, 2.0% $SrO_2$, 1.0% glass powder, 2.0% $Co_3O_4$, and 88.0% $NaClO_3$.
3rd layer: 63 grams. 7.0% tin powder, 2.0% $SrO_2$, 1.3% $Co_3O_4$, 1.1% glass powder and 88.7% $NaCl_3$.
4th layer: 90 grams. 3.5% iron powder 2.0% $SrO_2$, 0.2% $Co_3O_4$, 2.0% glass powder, and 92.3% $NaClO_3$.
5th layer: 40 grams. 1.5% iron powder, 3.0% $SrO_2$, 2.0% glass powder and 93.5% $NaClO_3$.

The ingredients were mixed, and a chemical oxygen generating core was pressed, dried, loaded and tested in the same way as described in example 1. When ignited the oxygen generating core operated smoothly for 15.7 minutes and generated 72.5 liters of oxygen at room temperature at a very smooth oxygen generation rate.

EXAMPLE 3

1st layer; 20 grams; 11.0% tin powder, 9.0% cobalt oxide, 1.0% $SrO_2$, 3.0% glass powder, 76.0% $NaClO_3$.
2nd layer; 50 grams; 7.0% tin powder, 2.0% $SrO_2$, 2.3% cobalt oxide, 1.5% glass powder, and 87.2% $NaClO_3$.
3rd layer; 90 grams; 7.0% tin powder, 2.5% $SrO_2$, 1.4% cobalt oxide, 1.5% glass powder and 87.6% $NaClO_3$.
4th layer: grams; 3.5% iron powder, 4.0% $SrO_2$, 1.5% glass powder and 91.0% $NaClO_3$.
5th layer: 60 grams; 2.2% tin powder, 4.0 $SrO_2$, 2.0% glass powder and 91.8% $NaClO_3$.

Chemical oxygen generating cores were formed using these mixtures according to the procedure described in example 1. When loaded in a stainless steel housing and ignited, an oxygen generating core reacted for 17.5 minutes and generated 96 liters oxygen.

EXAMPLE 4

1st layer: 30 grams; 10.5% tin powder, 9.2% cobalt oxide, 4.0% glass powder, and 76.3% $NaClO_3$.
2nd layer: 70 grams; 6.5% tin powder, 0.7% MgO, 2.9% cobalt oxide, 1.0% glass powder, and 88.9% $NaClO_3$.
3rd layer: 150 grams; 6.3% tin powder, 0.7% MgO, 1.8% cobalt oxide, and 91.2% $NaClO_3$.
4th layer: 250 grams; 5.5% tin powder, 0.8% $Ca(OH)_2$, 0.88% cobalt oxide, and 92.82% $NaClO_3$.
5th layer: 660 grams; 3.5% iron powder, 4.0 $SrO_2$, 1.5% glass powder and 91.0% $NaClO_3$.

Chemical oxygen generating cores were formed using these mixtures according to the procedure described in example 1. When loaded in a stainless steel housing and ignited, an oxygen generating core reacted for 26.9 minutes and generated 318 liters oxygen.

It will be apparent from the foregoing that while particular forms of the invention have been illustrated and described, various modifications can be made without departing from the spirit and scope of the invention. For instance, although water was utilized in processing the compositions in the examples above, it would be possible to suitably compress dry mixtures to form chemical oxygen generating blocks. The chemical oxygen generating blocks as illustrated are typically generally cylindrical with a taper, but molds could be constructed in many other configurations. While the oxygen generating compositions can be used as an emergency source of breathable oxygen in passenger aircraft, the oxygen generating compositions may also be used as a source of breathable oxygen gas in submarines, diving and mountain climbing, as a reliable supply of oxygen gas of breathable quality. Accordingly, it is not intended that the invention be limited, except as by the appended claims.

What is claimed is:

1. An oxygen generating composition for producing a breathable gas upon ignition of the composition, comprising:

iron powder as a fuel;

strontium peroxide as a sole catalyst and as a sole chlorine remover and reaction rate modifier for the oxygen generating composition; and an oxygen source selected from the group consisting of alkali metal chlorates, alkali metal perchlorates, and mixtures thereof.

2. The oxygen generating composition of claim 1, further comprising a binder.

3. The oxygen generating composition of claim 1, wherein said oxygen source is an alkali metal chlorate selected from the group consisting of sodium chlorate, potassium perchlorate, lithium perchlorate, and mixtures thereof.

4. The oxygen generating composition of claim 2, wherein said binder is an inorganic binder selected from the group consisting of glass powder, glass fiber, ceramic fiber, bentonite, kaolinite and mixtures thereof.

5. An oxygen generating composition for producing a breathable gas upon ignition of the composition, comprising:

from zero to about 15% by weight of iron powder as a fuel;

about 0.1–20% by weight strontium peroxide as a sole catalyst and as a sole chlorine remover and reaction rate modifier for the oxygen generating composition;

from zero to about 5% of a binder; and the remainder of an oxygen source selected from the group consisting of alkali metal chlorates, alkali metal perchlorates, and mixtures thereof.

6. The oxygen generating composition of claim 5, wherein said oxygen source is an alkali metal chlorate selected from the group consisting of sodium chlorate, potassium perchlorate, lithium perchlorate, and mixtures thereof.

7. The oxygen generating composition of claim 5, wherein said binder is an inorganic binder selected from the group consisting of glass powder, glass fiber, ceramic fiber, bentonite, kaolinite and mixtures thereof.

8. An oxygen generating composition for producing a breathable oxygen gas upon ignition of the composition, comprising:

from zero to about 12% by weight of iron powder as a fuel;

about 1–6% by weight strontium peroxide as a sole catalyst and as a sole chlorine remover and reaction rate modifier for the oxygen generating composition;

from zero to about 5% of a binder; and the remainder of an oxygen source selected from the group consisting of alkali metal chlorates, alkali metal perchlorates, and mixtures thereof.

9. The oxygen generating composition of claim 8, wherein said oxygen source is an alkali metal chlorate selected from the group consisting of sodium chlorate, potassium perchlorate, lithium perchlorate, and mixtures thereof.

10. The oxygen generating composition of claim 8, wherein said binder is an inorganic binder selected from the group consisting of glass powder, glass fiber, ceramic fiber, bentonite, kaolinite and mixtures thereof.

* * * * *

UNITED STATES PATENT AND TRADEMARK OFFICE
CERTIFICATE OF CORRECTION

PATENT NO. : 6,866,794 B1 Page 1 of 1
DATED : March 15, 2005
INVENTOR(S) : Yunchang Zhang and James C. Cannon It is certified that error appears in the above-identified patent and that said Letters Patent is hereby corrected as shown below:

Column 4,
Line 53, insert -- an -- after "with".

Column 5,
Line 7, delete "is" and insert -- are --.
Line 54, insert -- , -- after "catalyst".
Line 62, insert -- in -- after "ingredients".
Line 63, insert -- these -- after "water".

Column 6,
Line 6, insert -- metal -- after "Other".
Line 13, delete "composition" and insert -- decomposition --.
Line 23, insert -- an -- after "in".
Line 59, insert -- this -- after "critical to".

Column 7,
Line 21, insert -- of -- after "formation".
Line 58, delete "have" and insert -- has a --.
Line 58, insert -- a -- after "and".

Column 9,
Line 7, delete "NaCl$_3$" and insert -- NaClO$_3$ --.
Line 26, insert -- 120 -- before "grams".

Signed and Sealed this

Ninth Day of August, 2005

JON W. DUDAS
*Director of the United States Patent and Trademark Office*